3,264,391
**METHOD FOR PRODUCING POLYTETRAFLUORO-
ETHYLENE INSULATED WIRE**
Ford E. Warrick, Asheville, and Roger T. Guthrie, Enka, N.C., assignors to American Enka Corporation, Enka, N.C., a corporation of Delaware
No Drawing. Filed Mar. 22, 1962, Ser. No. 181,807
4 Claims. (Cl. 264—174)

This invention relates generally to an improved method for making insulated electrical conductors and more particularly to a method for insulating wire with polytetrafluoroethylene using an improved sintering system.

It is well known that polytetrafluoroethylene is an excellent insulator for electrical conductors. Likewise, many methods are known for applying coatings of polytetrafluoroethylene to wire. A method of particular significance is that in which polytetrafluoroethylene is extruded around a wire, commonly referred to as the paste extrusion process. The method comprises mixing collodial sized particles of polytetrafluoroethylene with a suitable hydrocarbon lubricant and forming a cylindrical preform of such material with a hole extending laterally therethrough. The preform is then placed in a ram-type extruding machine with the wire passing through the hole. The material of the preform is then extruded around the wire as the wire advances through the extruder die opening following which the thus-coated wire is immediately passed through electrical ovens which first vaporize and drive off the lubricant and then harden or sinter the polymer by raising it above the transition temperature of 621° F. for a short time. In such process, the lubricant is generally a mixture of various hydrocarbons such as those found in most grades of naphtha. Apparatus for conducting this known process is disclosed in U.S. Patent No. 2,825,091.

While the above-described process has been found to be satisfactory for most applications, it has certain disadvantages. In particular, due to the time required for vaporizing the lubricant and the time for sintering, the polymer may be extruded around the wire only at relatively low speeds. If the extrusion speed is increased, the length of the vaporizing oven and sintering oven must likewise be increased, resulting in unduly large space requirements. Thus, the speed of extrusion is limited by the space taken by ovens which become too long for practical purposes if extrusion speeds are increased above approximately 20 to 80 feet per minute, depending on the wall thickness of the insulation. Moreover, due to the highly flammable nature of the naphtha lubricating material, there is an ever present danger of fire occurring in the sintering oven even after the polymer-coated wire has been treated in a vaporizing oven. This problem is compounded when the extrusion speed is increased.

Accordingly, it is an object of this invention to provide a method for extruding thin coats of polytetrafluoroethylene on wire without the disadvantages present in the known processes.

Another object of this invention is to provide a method for extruding thin coats of polytetrafluoroethylene on wire at faster extruding speeds than those possible with the known processes.

Still another object of this invention is to provide a method for coating wire with polytetrafluoroethylene in which the danger of explosion or fire from the naphtha lubricant vapors is minimized.

A further object of this invention is to provide a method for coating wire with polytetrafluoroethylene which can be carried out in substantially less space than that required with the known processes.

These and other objects will be apparent from the following detailed description.

In accordance with this invention, polytetrafluoroethylene coated wire is produced using a multi-stage method comprising extruding the polymer around the wire and collecting the thus-produced unsintered coated wire under low tension on large metal spools or reels. Thereafter, the spool with the wire wrapped thereon is dipped into a molten sintering bath for a sufficient period of time to harden the polymer coating, following which it may be quenched in cold water. Extrusion speeds as high as 300 feet per minute have been attained using this system. Since the extrusion speed is not controlled by oven length and sintering time, there is no known upper limit to the speed at which the extrusion may be carried out.

The spools on which the unsintered wire is wound can be any conventional size or shape; however, the winding area thereon should be large enough to accommodate in one or two layers of windings the amount of wire that can be coated with one preform of polymer. Only one or two layers of unsintered polymer coated wire is wound on the spool since it has been found that multiple layers may deform the soft unsintered insulation on the lower layers due to the pressure exerted thereon by the outer layers.

The spools are made of sheet iron or steel and have flanges connected by a barrel which functions as the winding area of the spool. Best results are obtained if a perforated type spool is employed and preferably one in which both the flanges and barrel are perforated so as to allow the free flow of molten bath around the wire during sintering. Satisfactory hole sizes may range from ¼″ to ½″ in diameter with the holes spaced from ¼″ to 1″ apart. The spools should be sufficiently large in diameter so that the normal component of the force resulting from reasonable winding tension would not be sufficient to cause distorting of the insulation. Sizes may range from 6″ to 30″ in diameter or larger with the width being determined by that amount of wire to be wound on the spool.

The sintering bath is maintained at a temperature ranging from 640° F. to 790° F. However, if it is desired to obtain a polytetrafluoroethylene-coated wire that is not discolored, the sintering bath temperature should be kept below 680° F. Moreover, it has been found that temperatures higher than 750° F. will degrade to some extent the polytetrafluoroethylene coating thereby reducing its molecular weight. This results in excessive crystallization and deterioration of mechanical properties. Materials that have been found to be particularly satisfactory for use in the sintering bath are oxidizing salts such as sodium nitrite and sodium nitrate, although the particular salt or other compound used is not critical as long as they are molten at the particular sintering temperatures required and do not corrode the spool or degrade the polytetrafluoroethylene coating on the wire. If a bondable outer surface on the polymer coating is desired, a reducing bath such as lead or various alloys of other materials can be used. Sintering time can range from ten seconds to five minutes or longer; however, it is preferred to keep the sintering time within a range of 30 seconds to three minutes.

Prior to applicants' invention, it was not thought practical to handle unsintered polytetrafluoroethylene-coated wire in package form. Unsintered polytetrafluoroethylene is very soft and easily distorted. Surprisingly, it was found that unsintered polytetrafluoroethylene-coated wire can be handled in package form if it is wound on a spool under a very low tension. This is a critical feature of applicants' method. Preferably, winding operations should be conducted under as low tension as possible so as to avoid flattening the unsintered coating against the surface of the spool. Tensions ranging from one-half pound to two pounds are preferred, although somewhat higher winding tensions may be used under certain conditions. When the unsintered polymer-coated wire is wound on the spool under these conditions, the polymer is not deformed by the spool barrel or adjacent windings. During sintering the polymeric coating shrinks around the wire and thus also away from the spool barrel so that the finished sintered wire hangs on the spool in helical rings under substantially zero tension.

In a typical extrusion, the naphtha-lubricated preform of polytetrafluoroethylene is placed in the cylinder of a conventional ram-type extruder and the polymer is extruded around the wire as it passes through the extruder die. Normally, die temperatures of 75° F. to 140° F. are sufficient to produce a satisfactory extrudate. Immediately after the extrusion, the coated wire is wound in one layer on a carbon steel spool, following which the spool is stored in a ventilated chamber until all of the naphtha vapors are drawn off. Alternatively, a vaporizing chamber may be placed between the extruder and the take-up spool to drive off most of the naphtha vapors and the spools of wire then stored for sufficient length of time to remove the balance of the naphtha lubricant. Thereafter, the spools of wire are sintered in a molten salt bath consisting of 50% sodium nitrite and 50% sodium nitrate maintained at a temperature of about 700° F. After 30 seconds to two minutes in the salt bath, the spools of heat-treated polymer-coated wire are removed and quenched in a cold water bath. The wire thus produced has an especially uniformly sintered coating of polytetrafluoroethylene and possesses excellent insulating properties.

The following example is given by way of illustration and not limitation.

*Example*

A number of polytetrafluoroethylene preforms were prepared using as a lubricant V.M. & P. grade naphtha. Each preform was then placed in a conventional ram-type extruder with the conductor being introduced into the extruder cylinder through a wire guide tube and guide tube tip. The conductor used was 22 gauge, 7/30 silver-coated copper. The polymer was extruded at 225 feet per minute around the conductor as it advanced through the extruder die. The temperature of the extruder die was maintained at about 150° F. Immediately after leaving the extruder, the coated wire was passed through a vaporizing oven heated to about 400° F. to vaporize and drive off the naphtha lubricant. After leaving the vaporizing oven, each wire sample was collected under one-half pound tension on a carbon-steel spool having a barrel diameter of 20 inches and 20-inch width. The size of the spool was sufficient to allow the coated wire extruded from one preform to be wound in one layer on the barrel. The spools were then stored for 24 hours at room temperature under ventilation sufficient to remove any remaining naphtha vapors. After storage, the spools were dipped in a molten salt bath of 50% sodium nitrite and 50% sodium nitrate. Sintering time and bath temperature were varied for different spools. Following the heat treatment the spools were quenched in a cold water bath. The thickness of the sintered polytetrafluoroethylene coating on the wire was 10 mils. The resultant properties of the insulated wire, together with the conditions under which each sample was sintered, are set forth in the table below.

TABLE

| Sample No. | Sintering Time | Bath Temp., °F. | Tensile Strength, p.s.i. | Elongation at break, percent |
|---|---|---|---|---|
| 1 | 15 sec | 700 | 10,480 | 400 |
| 2 | 30 sec | 700 | 10,400 | 472 |
| 3 | 45 sec | 700 | 9,520 | 340 |
| 4 | 1 min | 700 | 10,160 | 466 |
| 5 | 3 min | 700 | 9,840 | 466 |
| 6 | 2 min | 770 | 6,640 | 524 |
| 7 | 10 min | 760 | 5,520 | 566 |
| 8 | 3 min | 640 | 6,160 | 491 |

From the table it can be seen that with short sintering times and lower temperatures, the insulation has a higher tensile strength and lower elongation at break than with longer sintering times and higher temperatures. Samples of wire extruded using the conventional prior art method of oven sintering possess corresponding properties.

The properties of the polytetrafluoroethylene insulation produced can be controlled very closely by adjusting the sintering conditions. The molten salt bath is capable of much closer temperature control than are air ovens presently used for sintering. It is thus possible to obtain a more uniformly sintered insulation than heretofore thought possible. Moreover, the overall properties of the wire thus produced are excellent and compare favorably with wire extruded and sintered using conventional systems. Using the system of this invention, extruder speeds can be increased at least three times over those speeds previously attained, thereby greatly improving the economies of the system. Additionally, the danger of fire during sintering is minimized since the unsintered wire may be conveniently stored until all of the residual naphtha has vaporized and been expelled.

Although certain particular embodiments of the invention have been disclosed for purposes of illustration, various changes and alterations and modifications will be apparent to those skilled in the art without departing from the spirit or scope thereof. Accordingly, the invention is intended to be limited only as set forth in the following claims.

What is claimed is:

1. A method for producing polytetrafluoroethylene insulated wire comprising the steps of extruding a coating of polytetrafluoroethylene around a wire at an extrusion die temperature above room temperature, collecting the wire under low tension on a metal spool in one layer of windings, storing the spool of wire for a period sufficient to evolve vaporizable constituents from the polytetrafluoroethylene coating, dipping the spool of wire in a molten sintering bath for a period sufficient to harden the polytetrafluoroethylene coating, and quenching the spool of wire in cold water.

2. A method for producing polytetrafluoroethylene insulated wire comprising extruding a coating of polytetrafluoroethylene around a wire at an extrusion die temperature of from 85 to 140° F., collecting the wire under low tension on a metal spool in a maximum of two layers of windings, storing the spool for a period sufficient to evolve vaporizable constituents from the polytetrafluoroethylene coating, dipping the spools of wire for from ½ minute to 2 minutes in a molten sintering bath maintained at a temperature of from 640 to 780° F., and quenching the wire in cold water.

3. The method of claim 2 in which the molten bath comprises a mixture of sodium nitrite and sodium nitrate.

4. The method of claim 2 in which the molten sintering bath comprises lead.

(References on following page)

References Cited by the Examiner

UNITED STATES PATENTS

| | | | |
|---|---|---|---|
| 1,500,546 | 7/1924 | Burley | 18—59 |
| 2,406,127 | 8/1946 | Alfthan. | |
| 2,485,691 | 10/1949 | Bogese. | |
| 2,685,707 | 8/1954 | Llewellyn. | |
| 2,752,321 | 6/1956 | Heller. | |

ALFRED L. LEAVITT, *Primary Examiner.*

MICHAEL V. BRINDISI, ROBERT F. WHITE, ALEXANDER H. BRODMERKEL, *Examiners.*